(12) United States Patent
Morio et al.

(10) Patent No.: US 6,400,431 B1
(45) Date of Patent: *Jun. 4, 2002

(54) LIQUID CRYSTAL DISPLAY ELEMENT

(75) Inventors: Kenji Morio; Satoshi Taniguchi; Kenjiro Hamanaka, all of Kanagawa (JP)

(73) Assignee: Micro Optics Co., Ltd., Sagamihira (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,431

(22) Filed: Oct. 21, 1998

(30) Foreign Application Priority Data

Oct. 22, 1997 (JP) ................................. 9-289520

(51) Int. Cl.[7] ............................ G02F 1/1335; G02F 1/13

(52) U.S. Cl. .............................................. 349/95; 349/187
(58) Field of Search .............................. 349/95, 5, 158, 349/187

(56) References Cited

U.S. PATENT DOCUMENTS

| 4,634,227 | A | * | 1/1987 | Nishimura et al. | 350/334 |
| 5,225,935 | A | * | 7/1993 | Watanabe et al. | 359/619 |
| 5,548,372 | A | * | 8/1996 | Schroeder et al. | 355/53 |
| 5,850,276 | A | * | 12/1998 | Ochi et al. | 349/95 |

* cited by examiner

Primary Examiner—Toan Ton
Assistant Examiner—Dung Nguyen
(74) Attorney, Agent, or Firm—Pillsbury Winthrop LLP

(57) ABSTRACT

By fitting a planar microlens array provided with one or more marks with a liquid crystal panel provided with one or more corresponding marks, it is possible to align the position of both exactly. The marks according to the present invention may comprise rod shapes, cross shapes, ring shapes, or square shapes, among others.

7 Claims, 4 Drawing Sheets

LIQUID CRYSTAL DISPLAY ELEMENT

BACKGROUND OF THE INVENTION

1. Field of the Invention

The present invention relates to a liquid crystal display element formed by bonding a planar micro-lens array onto a liquid crystal panel.

2. Description of Related Art

As shown in FIGS. 7 and 8, a liquid crystal display element is formed by bonding a planar microlen array 200 onto a liquid crystal panel 100. A gap is formed between the glass substrates 101 and 102 by a spacer 103. The liquid crystal 105 is poured into the gap. On a surface of the glass substrate 101, opposing a electrodes 101a are formed on the side of the liquid crystal 105. On a surface of the other glass substrate 102 transparent pixel electrodes 102a are formed on the side of the liquid crystal 105. Further, additional portions other than the transparent pixel electrodes 102a are formed which are not transparent, such as wiring, TFTS (thin film transistors), etc.

Recessed portions are formed on the glass substrate 201. A resin of high refractive index is filled into and cured in the recessed portions, thereby obtaining a large number (a plurality) of small convex lens 202 which are bonded onto the liquid crystal panel 100 by a bond comprising a resin of low refractive index. The low refractive index serves to focus irradiated light through each of the plural convex lens into pixel electrodes (i.e., openings for the pixels) 102a, so as to increase the brightness of an image projected upon the screen.

As another method of providing a large number of convex lens in the planar micro-lens array, the plural microlenses can also be directly formed a stamper by performing a stamping process on the surface of a glass substrate without forming recessed portions on the glass substrate.

In the case of bonding a planar micro-lens array 200 onto a liquid crystal panel 100, if the position is off or if the two are misaligned, it becomes impossible to obtain correct focusing of the light irradiated onto the pixel electrodes (i.e., the openings for the pixels) 102a.

Therefore, in the conventional art, marks 203 are formed in four corners at the same time when a large number of convex lens 202 are formed i.e., sequentially. As shown in FIG. 8, a planar microlens array 200 and a liquid crystal panel 100 are made to fit together by aligning marks 104 with the marks 203, in which the marks 104 are formed on the bonding surface of the liquid crystal panel 100 in advance.

The marks 203, formed on the side of the planar microlens array 200, are formed with a resin of high refractive index. Therefore the marks 104 on the side of the liquid crystal panel 100 can be seen through the marks 203 which act as convex lens. As a result, it is difficult to fit the marks exactly.

SUMMARY OF THE INVENTION

To resolve the problem described above, the present invention includes a liquid crystal display element formed by bonding a planar microlens array onto a liquid crystal panel, comprising a plurality of convex lens and a first mark formed on the surface of said planar microlens array with a resin of high refractive index, and a second mark which corresponds to the first mark on the planar microlens array formed on the surface of the liquid crystal panel, wherein said first and second marks have corresponding forms so as to precisely fit and align the planar microlens array with the liquid crystal panel, by placing one of the first mark and the second mark into the space formed with the other of the first and the second mark.

The second mark on the side of the liquid crystal panel can be seen through the flat part which does not act as a lens of the planar microlens array, and therefore, easily aligning the planar array and panel.

DESCRIPTION OF THE PREFERRED EMBODIMENTS

Figure 1:
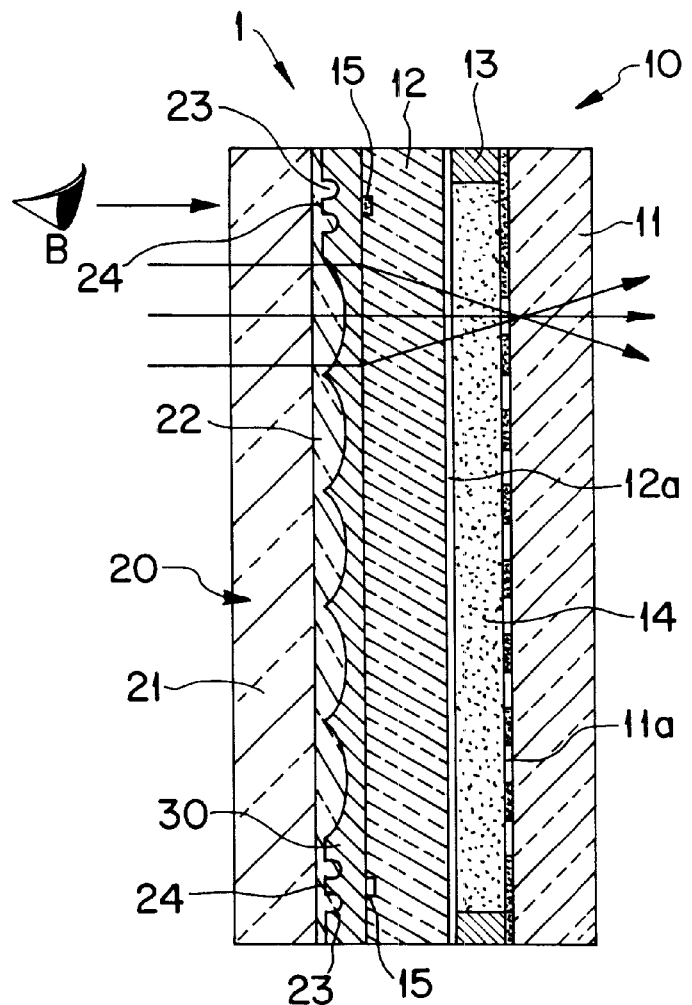
FIG. 1 shows a cross-section view of a liquid crystal display element according to the present invention.
Figure 2:
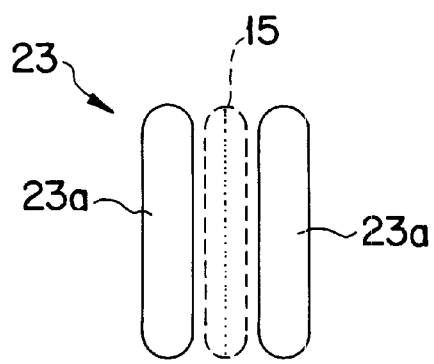
FIG. 2 shows an enlarged view of FIG. 1 from the direction of arrow B shown in FIG. 1.

Hereinafter, detailed explanations of the embodiments of the present invention will be given by referring to the attached drawings. Here, a liquid crystal display element is formed by bonding a planar microlens array onto a liquid crystal panel 10 with a resin of low refractive index 30.

In the liquid crystal panel 10, a gap is formed between glass substrates 11 and 12 by a spacer 13, into which liquid crystal 14 is poured. On a surface of the glass substrate 12 there are formed opposing electrodes 12a at the side of the liquid crystal 14. On a surface of the other glass substrate 11 there are formed transparent pixel electrodes 11a at the side of the liquid crystal 14. Further, additional portions other than the transparent pixel electrodes 11a are formed which are not transparent, such as wiring, TFTs (thin film transistors), etc.

A first mark 15 is formed in four corners of the surface opposite to the planar microlens array 20 of the glass substrate 12. The first mark 15 can be formed by, a screen printing process. As shown in FIG. 1, the first mark 15 is formed on the surface of the planar microlens array 20 facing the glass substrate 12 of the liquid crystal panel 10. However, of course, the first mark may be formed in the surface opposite to the liquid crystal 14 of the glass substrate 12.

On the other hand, in the planar microlens array 20, a resin of high refractive index is applied onto the surface of the glass substrate 21, which is molded with a stamper. A large number of convex lens 22 are formed by curing by use of ultra violet (UV) light or heat. Further, second marks 23 are formed in four corners at the same time when a large number of convex lens 22 are formed.

Here, the first mark 15 is rod-shaped. The second mark 23 comprises two rod-like mark elements 23a. The sizes of the first mark 15 and the second mark 23 (mark elements 23a) are set up in order to mutually interfit the position of both exactly by piling or aligning the planar microlens array with the liquid crystal panel so as to place the first mark 15 between the mark elements 23a of the second mark 23.

It should be noted that although only one pair of corresponding marks is described above, the invention may likewise be applied to two or more pairs of corresponding marks.

Figure 3:
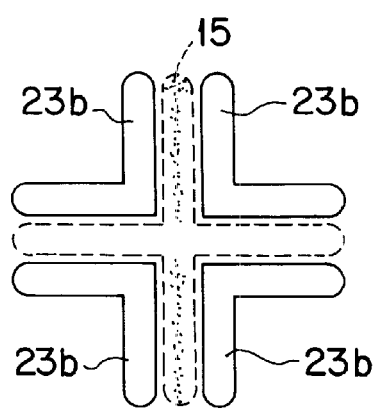
FIG. 3 shows the same view as FIG. 2, showing another embodiment.

As shown in FIG. 3, the first mark 15 is cross-shaped and the second mark 23 comprises four angle-shaped mark elements 23b. The first mark 15 and the mark elements 23b of the second mark 23 are aligned in order to mutually interfit the position of both exactly by piling or aligning the planar microlens array with the liquid crystal panel so as to place the first mark 15 into the gap formed between the mark elements 23b of the second mark 23.

Figure 4:
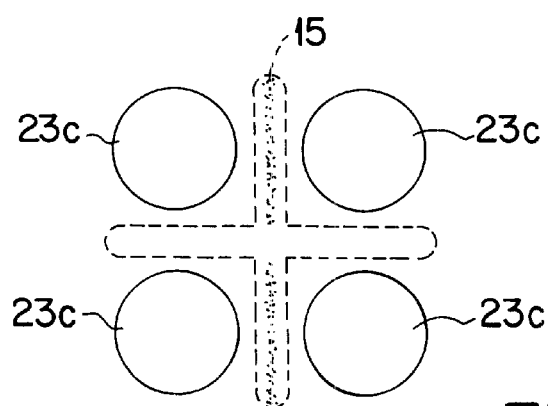
FIG. 4 shows the same view as FIG. 2, showing another embodiment.
Figure 5:
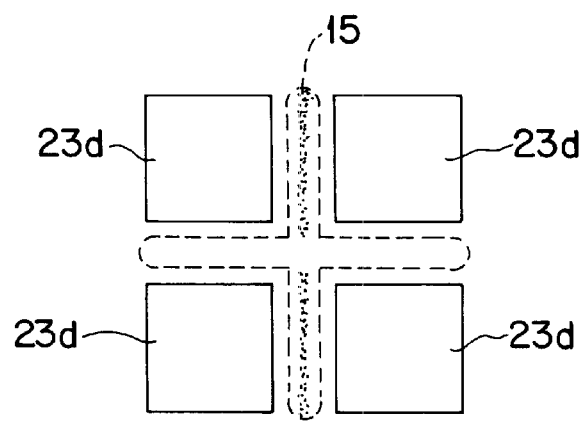
FIG. 5 shows the same view as FIG. 2, showing another embodiment.
Figure 6:
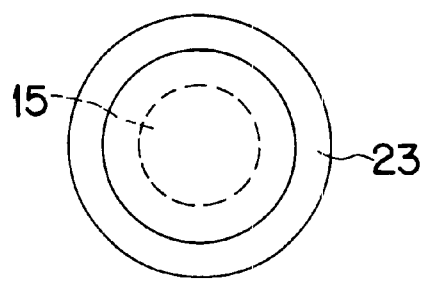
FIG. 6 shows the same view as FIG. 2, showing another embodiment.
Figure 7:
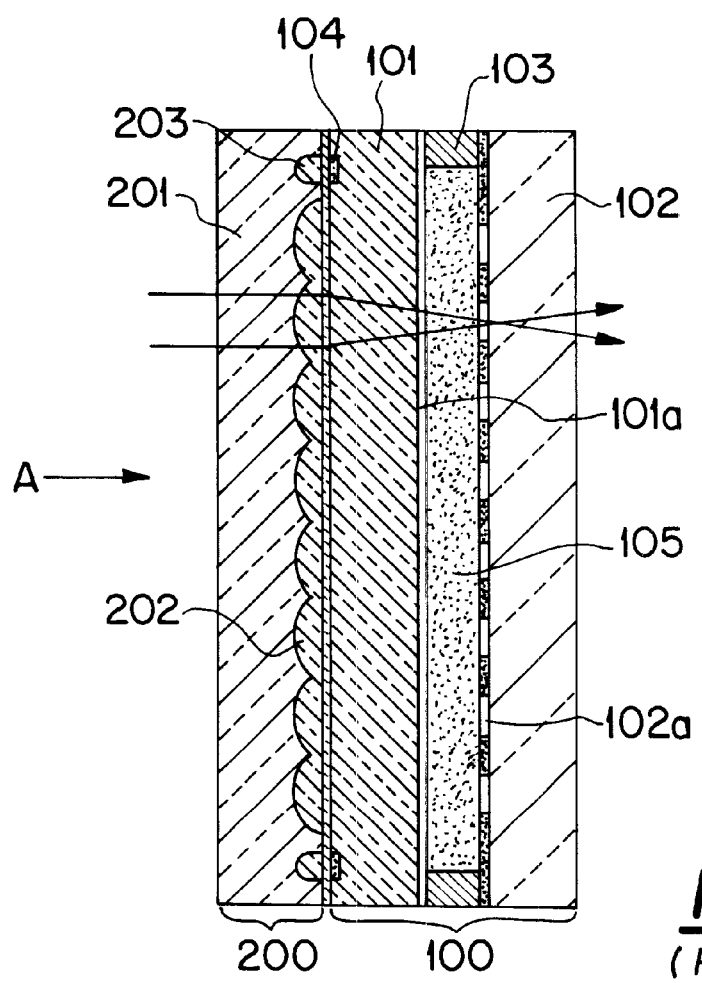
FIG. 7 shows a cross-section view of a conventional liquid crystal display element.
Figure 8:
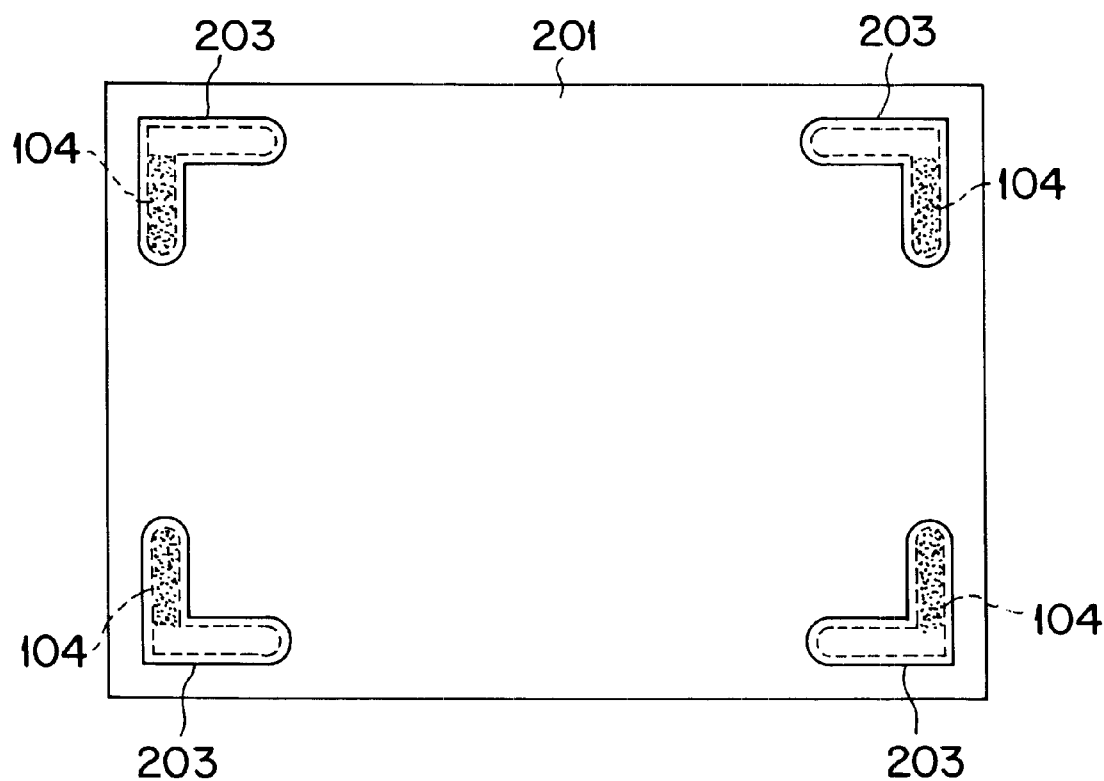
FIG. 8 is a view of FIG. 7 from the direction of the arrow A in FIG. 7.

As shown in FIG. 4, the first mark 15 is cross-shaped and the second mark 23 comprises four round-shaped mark elements 23c. As shown in FIG. 5, the first mark 15 is cross-shaped and the second mark 23 comprises four square-shaped mark elements 23d. As shown in FIG. 6, the first mark 15 is round-shaped and the second mark 23 is ring-shaped.

The various embodiments mentioned above are all equally effective in permitting the planar array and the panel to be precisely aligned, thus resolving the drawback inherent in the prior art device.

In the examples shown in drawings, the first mark 15, located at the side of the liquid crystal panel, is placed into the gap or the space formed by the second mark 23, located at the side of the planar microlens array. However, this situation may be reversed, obtaining the same ease of alignment.

Moreover, in the drawings, examples are shown in which a resin of high refractive index is applied onto the surface of the glass substrate and a large number of convex lens are formed by a stamper. The present invention is not limited to such an arrangement, and can be equally applied to a liquid crystal display element in which recessed portions are formed on a glass substrate by etching and a resin of high refractive index is filled and cured in these recessed portions.

As is fully explained above, in accordance with the present invention, since the first and second marks, which are used when a liquid crystal display element is formed by bonding a planar micro-lens array onto a liquid crystal panel, are formed so as to precisely correspond with each other any marks at the side of the liquid crystal panel can be seen through the flat space 24 which does not act as lens of the planar microlens array. Therefore it becomes easy to align the position of the array and the panel.

What is claimed is:

1. A method of forming a liquid crystal display element comprising:

forming a liquid crystal panel;

forming a first mark on a surface of the liquid crystal panel;

forming a planar microlens array;

forming a plurality of convex lenses on a surface of the planar microlens array by applying a resin of high refractive index onto the surface of the planar microlens array and molding the resin of high refractive index into the plurality of convex lenses through an application of ultraviolet rays;

forming a second mark on the surface of the planar microlens array by employing the molding of the resin of high refractive index to simultaneously form the second mark with the forming of the plurality of convex lenses, the second mark having at least two mark elements defining a flat space therebetween;

placing the first mark within the flat space formed by the at least two mark elements of the second mark so that the convex lenses align with the liquid crystal panel and a path between the first mark and the second mark is unobstructed; and bonding the planar microlens array onto the liquid crystal panel with a resin of low refractive index.

2. A method of forming a liquid crystal display element as defined in claim 1, wherein the forming of the liquid crystal panel comprises:

disposing a spacer between a pair of glass substrates;

pouring liquid crystal between the pair of glass substrates;

forming opposing electrodes on a surface of one of the glass substrates; and forming transparent pixel electrodes on a surface of an other of the glass substrates.

3. A method of forming a liquid crystal display element, as defined in claim 1, includes forming the second mark with two mark elements.

4. A method of forming a liquid crystal display element, as defined in claim 3, includes positioning the two mark elements parallel to each other.

5. A method of forming a liquid crystal display element, as defined in claim 1, includes forming the second mark with four mark elements.

6. A method of forming a liquid crystal display element, as defined in claim 5, includes forming each of the four mark elements with perpendicular segments so that each segment aligns in parallel with a segment of another elements.

7. A method of forming a liquid crystal display element, as defined in claim 5, includes positioning each element in parallel with two of the other elements.

* * * * *